E. B. WINSHIP.
Improvement in Clothes-Driers.

No. 129,385.    Patented July 16, 1872.

Witnesses:    Eugene B. Winship
    Inventor:

129,385

UNITED STATES PATENT OFFICE.

EUGENE B. WINSHIP, OF RACINE, WISCONSIN.

IMPROVEMENT IN CLOTHES-DRIERS.

Specification forming part of Letters Patent No. 129,385, dated July 16, 1872.

I, EUGENE B. WINSHIP, of Racine, in the county of Racine and State of Wisconsin, have invented an Improvement in Clothes-Bars, of which the following is a specification:

My invention relates to the combination of a rod and thumb-screw with a slotted latch or latches, the object being to readily and conveniently adjust the drier to any desired position required for use, or to fold it for storage.

Figure 1:
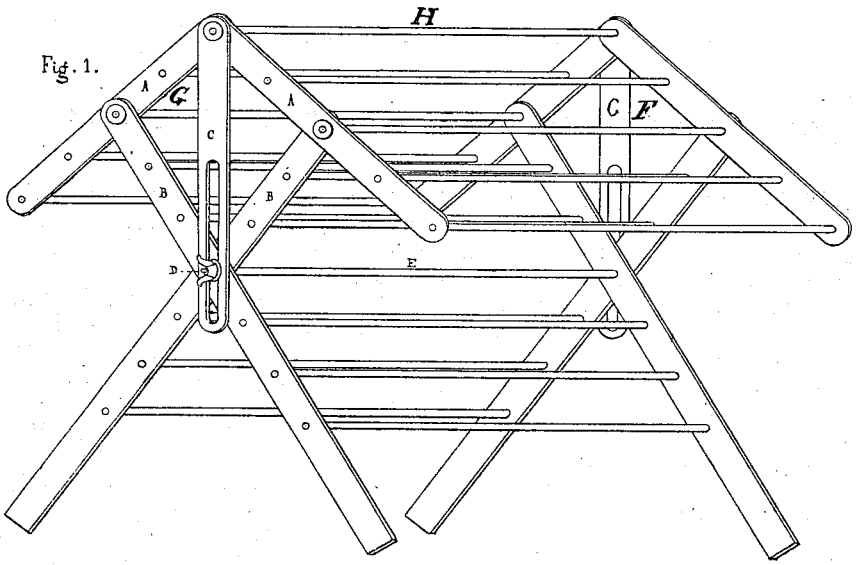
Figure 2:
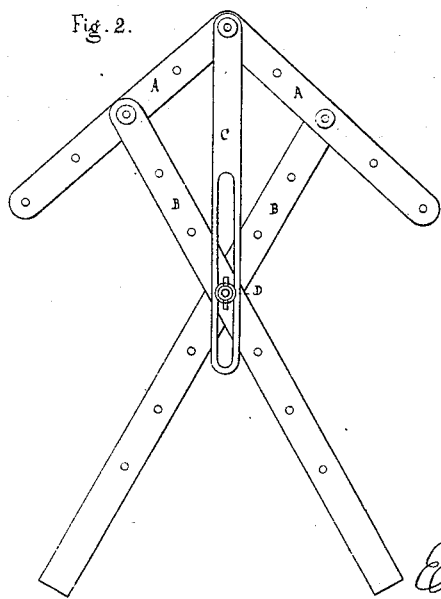

Figure 1 represents a side elevation of the drier; Fig. 2, an end section of the same.

A A are arms, of which there are two at each end. B B are standards, of which there are also two at each end, being fastened together in the form of an X by the rod E and joined together and to the arms by it and the rods F, G, and H extending from end to end. As many other rods may be used as may be desired. C C are slotted latches, the upper ends being fastened to the ends of the rod F, and the slotted portion made so as to move upon the ends of the rod E, which has a lateral motion and is fitted at one end with a thumb-screw, D, and at the other with a head, and is made square directly under the head, to prevent it from turning.

The drier is movable on the rods E, F, G, and H as centers, and can be folded or spread at will by loosening the thumb-screw D, or fastened in any required position by tightening it.

I make no claim to the shape or form of the drier, nor to the manner of constructing it, for I am aware that these are not new; but

I claim as my invention and improvement—

The arrangement of the bar or rod E with its thumb-screw and nut D, in combination with the standards B B, arms A A, and latches C C, as shown and described, for the purpose set forth.

EUGENE B. WINSHIP.

Witnesses:
   N. G. EADIES,
   A. TOUSLEY.